United States Patent
Khan et al.

(10) Patent No.: US 12,263,423 B2
(45) Date of Patent: Apr. 1, 2025

(54) MICRO-MACHINED FILTER FOR MAGNETIC PARTICLES

(71) Applicant: International Business Machines Corporation, Armonk, NY (US)

(72) Inventors: Babar Khan, Ossining, NY (US); Emily R. Kinser, Poughkeepsie, NY (US)

(73) Assignee: International Business Machines Corporation, Armonk, NY (US)

(\*) Notice: Subject to any disclaimer, the term of this patent is extended or adjusted under 35 U.S.C. 154(b) by 0 days.

(21) Appl. No.: 18/318,762

(22) Filed: May 17, 2023

(65) Prior Publication Data

US 2023/0285879 A1 Sep. 14, 2023

Related U.S. Application Data

(62) Division of application No. 17/130,029, filed on Dec. 22, 2020, now Pat. No. 11,684,878, which is a division of application No. 16/129,849, filed on Sep. 13, 2018, now Pat. No. 11,161,066.

(51) Int. Cl.
| | |
|---|---|
| *B01D 35/06* | (2006.01) |
| *B01D 39/16* | (2006.01) |
| *B01D 39/20* | (2006.01) |
| *B03C 1/033* | (2006.01) |
| *B03C 1/28* | (2006.01) |

(52) U.S. Cl.
CPC ......... *B01D 35/06* (2013.01); *B01D 39/1692* (2013.01); *B01D 39/20* (2013.01); *B01D 39/2003* (2013.01); *B03C 1/033* (2013.01); *B03C 1/288* (2013.01); *B03C 2201/18* (2013.01)

(58) Field of Classification Search
CPC .... B01D 35/06; B01D 39/1692; B01D 39/20; B01D 39/2003; B01D 2239/04; B03C 1/033; B03C 1/288; B03C 2201/18; B03C 2201/22; B03C 1/03; B03C 1/034
See application file for complete search history.

(56) References Cited

U.S. PATENT DOCUMENTS

| | | |
|---|---|---|
| 5,651,900 A | 7/1997 | Keller et al. |
| 5,798,042 A | 8/1998 | Chu et al. |
| 6,168,948 B1 * | 1/2001 | Anderson ............... B01F 31/86 435/6.12 |

(Continued)

OTHER PUBLICATIONS

Ivo Safarik, et al., "Magnetic techniques for the isolation and purification of proteins and peptides", BioMagnetic Research and Technology 2004, 2:7, 17 pages.

(Continued)

*Primary Examiner* — Waqaas Ali
(74) *Attorney, Agent, or Firm* — CANTOR COLBURN LLP; Stosch Sabo

(57) ABSTRACT

A method for filtering magnetic particles includes spinning a filter including a plurality of pores within a substrate. The method further includes applying, subsequent to spinning the filter, an external magnetic field to the filter. The method includes disposing a solution including a first particle and a second particle onto the filter. The first particle includes a magnetic particle of interest. The method further includes separating the first particle from the second particle by capturing the first particle within a pore of the plurality of pores within the substrate.

13 Claims, 7 Drawing Sheets

(56) References Cited

U.S. PATENT DOCUMENTS

| | | |
|---|---|---|
| 6,709,869 B2 | 3/2004 | Mian et al. |
| 6,825,127 B2 | 11/2004 | Ouellet et al. |
| 9,638,636 B2 | 5/2017 | Tibbe et al. |
| 9,657,290 B2 | 5/2017 | Dimov et al. |
| 11,161,066 B2 | 11/2021 | Khan et al. |
| 2002/0137218 A1 | 8/2002 | Main et al. |
| 2002/0197622 A1 | 12/2002 | McDevitt et al. |
| 2003/0022505 A1 | 1/2003 | Ouellet et al. |
| 2004/0018611 A1* | 1/2004 | Ward ................ B01L 3/502761 435/287.2 |
| 2009/0101559 A1 | 4/2009 | Bala Subramaniam et al. |
| 2010/0296986 A1 | 11/2010 | Feyh |
| 2012/0055854 A1* | 3/2012 | Tibbe ........................ B03C 1/01 209/214 |
| 2012/0183946 A1 | 7/2012 | Tang et al. |
| 2014/0008210 A1 | 1/2014 | Guia et al. |
| 2014/0011690 A1 | 1/2014 | Dimov et al. |
| 2014/0202960 A1 | 7/2014 | Nishijima et al. |
| 2015/0090661 A1 | 4/2015 | Kant et al. |
| 2015/0160135 A1 | 6/2015 | Tibbe et al. |
| 2016/0158756 A1* | 6/2016 | Issadore .................. B03C 1/035 422/534 |
| 2016/0355777 A1 | 12/2016 | Fachin et al. |
| 2017/0080436 A1 | 3/2017 | Chin et al. |
| 2021/0106933 A1 | 4/2021 | Khan et al. |

OTHER PUBLICATIONS

Johnson, D.C., et al.; "Structure, Function, and Formation of Biological Iron-Sulfur Clusters" Annu. Rev. Biochem. 2005.74:247-281.

List of IBM Patents or Patent Applications Treated as Related; Appendix P; Date Filed: May 17, 2023; 2 pages.

Richard Sensenig, et al., "Magnetic nanoparticle-based approaches to locally target therapy and enhance tissue regeneration in vivo", Nanomedicine (Lond). Sep. 2012 ; 7(9): 1425-1442.

Andrade et al., "Coating Nanomagnetic Particles for Biomedical Applications", In Biomedical Engineering—Frontiers and Challenges, Aug. 1, 2011, pp. 157-176.

\* cited by examiner

MICRO-MACHINED FILTER FOR MAGNETIC PARTICLES

BACKGROUND

The present invention generally relates to fabrication methods and resulting structures for particle filters. More specifically, the present invention relates to micro-machined filters for magnetic particles.

Filtration devices are used in a variety of fields, including pharmaceutical technology, biotechnology, bio-separation (e.g., plasma fractionation), and diagnostics. For many applications within these areas, desirable features for such filtration devices include precise control of pore sizes and distributions, absolute pore sizes as small as the nanometer (nm) range, mechanical strength, high throughput, and high durability.

SUMMARY

Embodiments of the present invention are directed to a method for filtering magnetic particles. A non-limiting example of the method includes spinning a filter including a plurality of pores within a substrate. The method further includes applying, subsequent to spinning the filter, an external magnetic field to the filter. The method includes disposing a solution including a first particle and a second particle onto the filter. The first particle includes a magnetic particle of interest. The method further includes separating the first particle from the second particle by capturing the first particle within a pore of the plurality of pores within the substrate.

Embodiments of the present invention are directed to a filter system for filtering magnetic particles. A non-limiting example of the filter system includes a micro-machined filter including a plurality of pores within a substrate. The filter system further includes a chamber including a surface for spinning the filter. The filter system includes a magnetic field generating device for applying a magnetic field to the filter.

Embodiments of the present invention are directed to a micro-machined filter for filtering magnetic particles. A non-limiting example of the micro-machined filter includes a plurality of pores within a substrate. The micro-machined filter further includes a magnetic liner arranged on sidewalls of pores of the plurality of pores. A pore of the plurality of pores has a width that is greater than a magnetic particle of interest, such that the magnetic particle of interest binds to the magnetic liner within the pore.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1A:
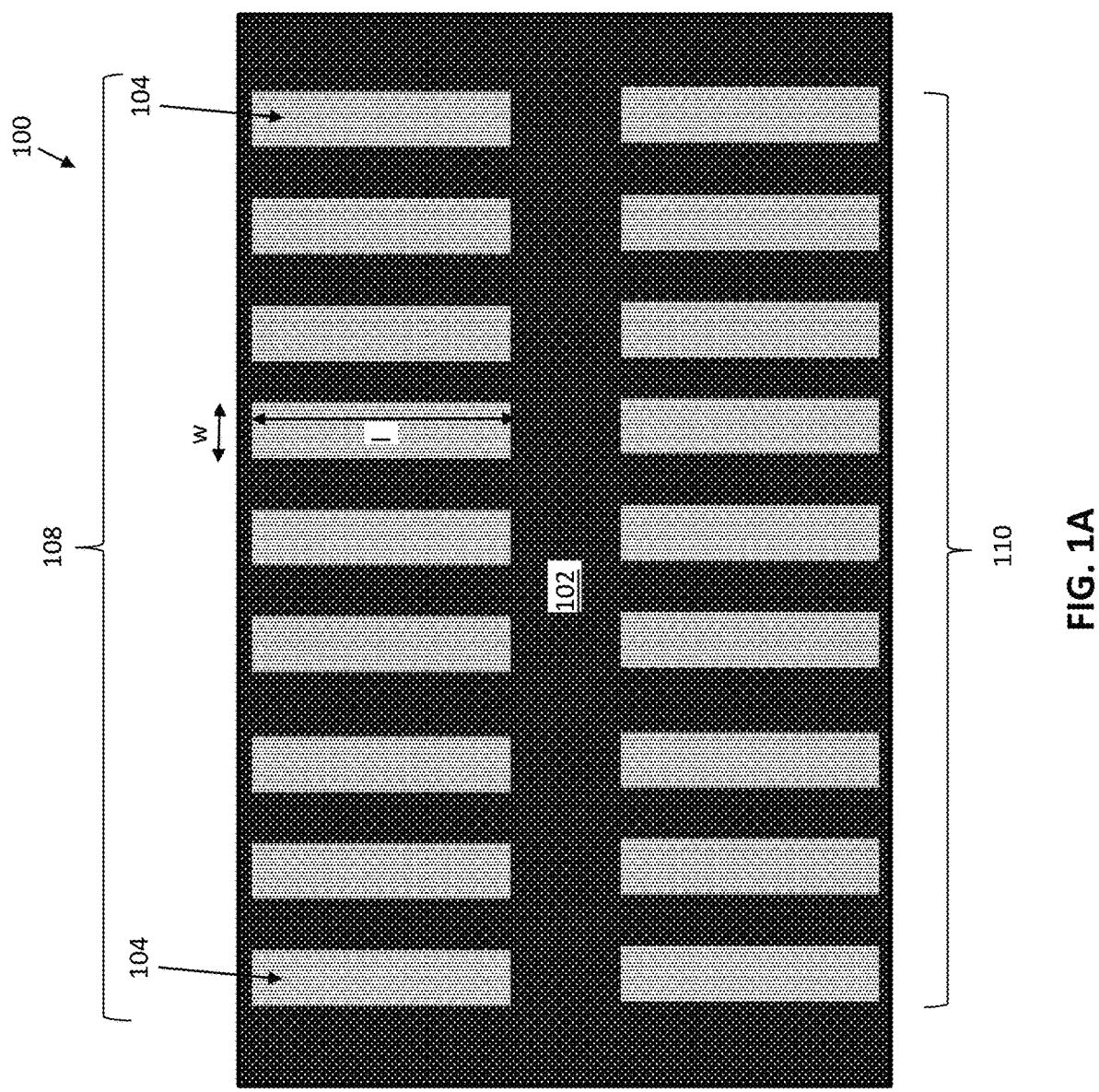
FIG. 1A depicts a top view of a filter according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices are well known and so, in the interest of brevity, many conventional steps will only be mentioned briefly herein or will be omitted entirely without providing the well-known process details.

Turning now to an overview of technologies that are more specifically relevant to aspects of the invention, microfabrication techniques can be used to create channels of any desired dimension in a variety of materials. Micro-fabricated filters enable filtration and capture of particles defined by the size of the channel, and removal of larger particles. However, particles having a size less than the dimensions of the channel will also be captured without discrimination, or regardless of other magnetic properties.

Another method for filtering particles in biomedical applications includes attaching ligands to magnetic particles (e.g., nano-magnetic particles having nano-dimensions) coated on a surface of a substrate. Particles that preferentially attach to the ligands bound to the magnetic particles can be separated from other particles upon application of a magnetic field. This method captures all particles that attach themselves preferentially to the magnetic particle, independent of their size.

Turning now to an overview of aspects of the invention, one or more embodiments of the invention address the above-described shortcomings of the prior art by providing a micro-machined filter that captures particles based on both size and magnetic properties. Microfabrication techniques (e.g., masking, patterning, and etching) are used to create etched cavities in planar substrates. According to some embodiments of the present invention, the micro-machined filter is spun in a coating chamber, and an external magnetic field is applied while a solution (or suspension) including the magnetic particles to be filtered/captured is dispensed onto the spinning filter. By adjusting the spin acceleration and speed of the spinning substrate and the applied external magnetic field, magnetic particles can be captured within the cavities. According to some embodiments of the present invention, the filter can also separate nonmagnetic particles from magnetic particles by coating the cavities with a magnetic film bound to ligands that interact with the magnetic particle of interest. An external magnetic field is not needed to capture the magnetic particles, as the magnetic field from the magnetic film will bind to the magnetic particles.

The above-described aspects of the invention address the shortcomings of the prior art by providing a micro-machined filter that separates magnetic particles from nonmagnetic particles, as well as discriminates based on size. Applying a magnetic field to a spinning filter substrate, or coating the substrate with a magnetic material, allows the capture of particles based on both size and magnetic properties. According to one or more embodiments of the invention, the filters are particularly useful for isolating and studying iron based clusters for example, which play a critical role in the chemistry and biology of many proteins.

Figure 1B:
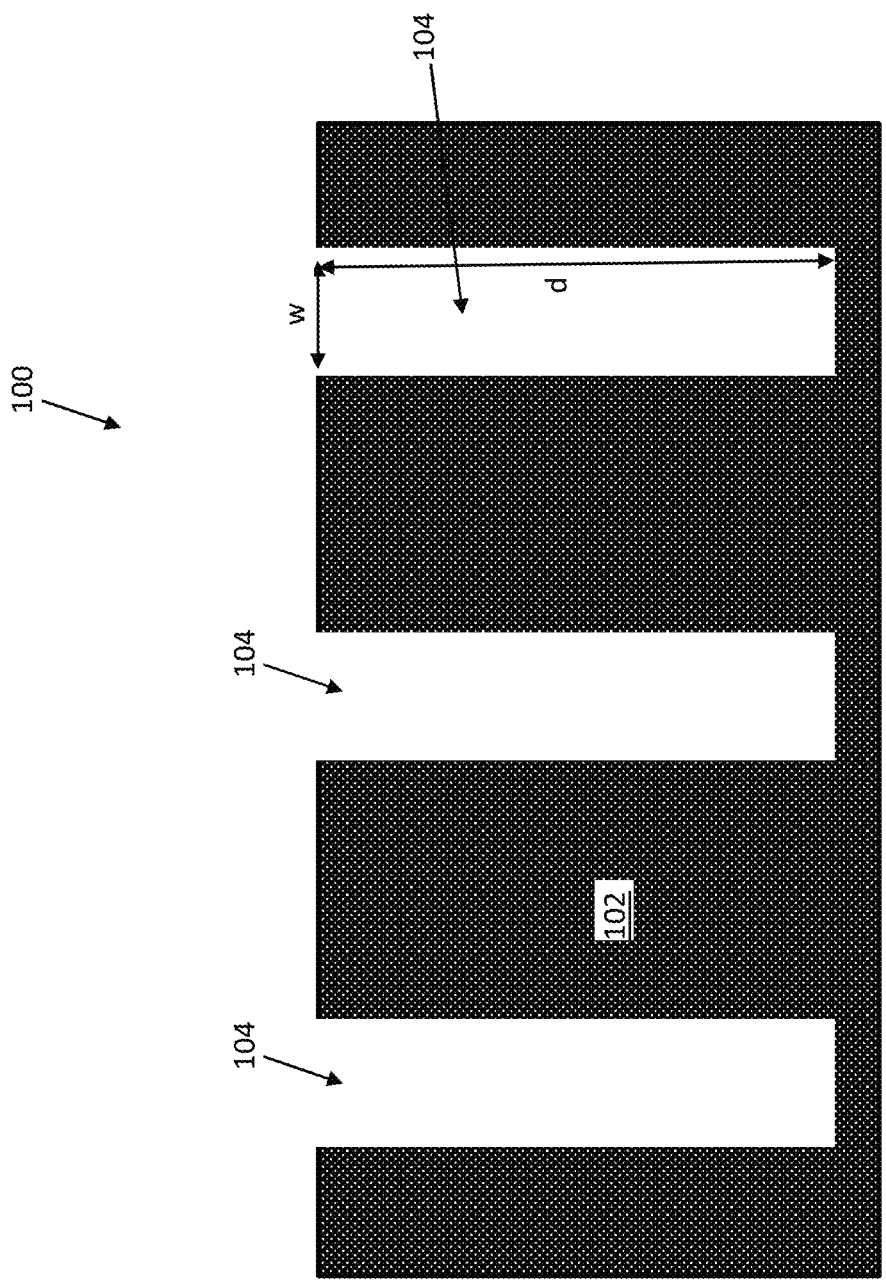
FIG. 1B depicts a cross-sectional side view of the filter shown in FIG. 1A.

Turning now to a more detailed description of aspects of the present invention, FIG. 1A depicts a top view of a filter 100 according to embodiments of the present invention. FIG. 1B depicts a cross-sectional side view of the filter 100 according to embodiments of the present invention. The filter 100 includes a plurality of pores 104. Each of the pores 104 has a width (w), length (l), and depth (d) (see also FIG. 1B). The shape of the pores 104 shown is for exemplary purposes and is not intended to be limited. The shape of the pores 104 can be, for example, circular, square, rectangular, elongated, etc. The width (w) of the pores 104 is the largest spherical particle that can pass through the pore. Although the filter 100 is shown as including a first row and second row of pores 104, the filter 100 can include any number of rows or numbers of pores 104.

The shape and dimensions (width (w), length (l), and depth (d)) of the pores can vary and depend on the size and type of particles to be filtered or captured. Although the pores 104 are shows as having a length (l) and depth (d) that are greater than the width (w), the dimensions of the pores 104 are not limited to these dimensions. According to some embodiments, the length (l), depth (d), and width (w) of the pores 104 are the same, or substantially the same. According to other embodiments, the shape of the pores are round holes. According to one or more embodiments of the present invention, the width (w) of the pores 104 is about 20 nm to about 5 µm. According to other embodiments of the present invention, the width (w) of the pores 104 is about 20 nm to about 500 nm. According to one or more embodiments of the present invention, the length (l) of the pores 104 is about 20 nm to about 10 µm. According to other embodiments of the present invention, the length (l) of the pores 104 is about 20 nm to about 1 µm. According to one or more embodiments of the present invention, the depth (d) of the pores 104 is about 40 nm to about 10 µm. According to other embodiments of the present invention, the depth (d) of the pores 104 is about 40 nm to about 2 µm.

It should be noted that the pore size (width (w), depth (d), and length (l)) of the filters 100 of the present invention can be easily modified by photolithography, etching, and thin film deposition techniques, such as chemical vapor deposition (CVD) of additional material on the pore walls to make the pores smaller, or thin film growth techniques such as oxidation of pore walls followed by oxide etching to make the pores larger. The pores can also be made smaller by altering the patterning or etching processes or by growing thermal oxide on them (e.g., dry oxidation at 800° C.) which is a precisely controllable process, for substrates such as silicon wafers that are readily oxidized. The filters 100 of the present invention can also be easily integrated with other micro-fabricated electronic, mechanical, or electromechanical devices. The constituent materials, pore dimensions and pore shapes can also be varied widely.

According to one or more embodiments of the present invention, the filter 100 includes pores 104 having more than one dimension. For example, the filter 100 can include a plurality of regions having pores of different sizes (a plurality of widths (w), depths (d), and lengths (l)), which enables capturing particles of different sizes using the same substrate. The filter 100 can include, for example, two or more regions that include two or more pore sizes.

The filter is fabricated using microfabrication techniques, including masking, patterning, and etching, to form a micro-fabricated filter. Microfabrication includes a collection of technologies that are utilized in making micro-devices. To fabricate a micro-device, many processes must be performed, one after the other, many times repeatedly. These processes include, for example, depositing a film, patterning the film with the desired micro features, and removing (or etching) portions of the film. Thin film metrology is used typically during each of these individual process steps, to ensure the film structure has the desired characteristics in terms of thickness (t), refractive index (n) and extinction coefficient (k), for suitable device behavior. The complexity of microfabrication processes can be described by their mask count. This is the number of different patterned layers that constitute the final device.

The starting planar substrate 102 includes one or more semiconductor materials dielectric materials, or other non-magnetic materials. Non-limiting examples of suitable substrate materials include Si (silicon), strained Si, SiC (silicon carbide), Ge (germanium), SiGe (silicon germanium), SiGeC (silicon-germanium-carbon), Si alloys, Ge alloys, III-V materials (e.g., GaAs (gallium arsenide), InAs (indium arsenide), InP (indium phosphide), or aluminum arsenide (AlAs)), II-VI materials (e.g., CdSe (cadmium selenide), CdS (cadmium sulfide), CdTe (cadmium telluride), ZnO (zinc oxide), ZnSe (zinc selenide), ZnS (zinc sulfide), or ZnTe (zinc telluride)), or any combination thereof. Other non-limiting examples of semiconductor materials for substrate 102 include III-V materials, for example, indium phosphide (InP), gallium arsenide (GaAs), aluminum arsenide (AlAs), or any combination thereof. The III-V materials can include at least one "III element," such as aluminum (Al), boron (B), gallium (Ga), indium (In), and at least one "V element," such as nitrogen (N), phosphorous (P), arsenic (As), antimony (Sb).

Non-limiting examples of dielectric materials for the substrate 102 include silicon oxide, glass, a flowable oxide, a high density plasma oxide, borophosphosilicate glass (BPSG), or any combination thereof.

Non-limiting examples of nonmagnetic materials that can be used for the substrate 102 include glass, quartz, plastic, or a combination thereof.

Trenches forming the pores 104 are etched in the substrate 102, for example, by anisotropic plasma etching with a photolithography patterned mask, which is etched away after the trench etching is complete. Depending on the desired size of the pores 104, molding or stamping techniques can be used to form the pores 104. The dimensions of the pores 104 (width (w), depth (d), and length (l)) can be adjusted using lithography and etching techniques to optimize capture of particles of a desired size.

Figure 6:
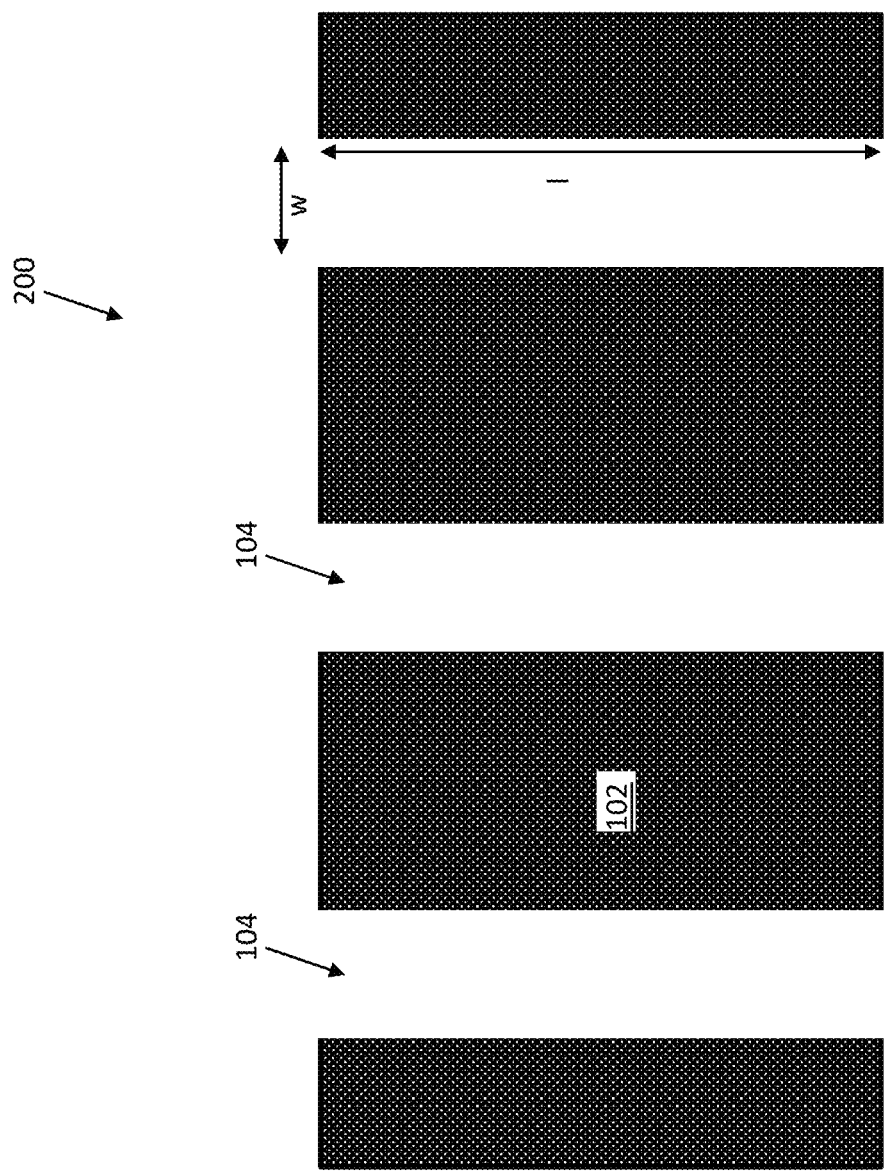
FIG. 6 depicts a cross-sectional side view of a filter according to embodiments of the present invention.

The pores 104 in the filter 100 do not extend all the through the substrate, as shown in FIG. 1B for example. Yet, in other embodiments, filters 200 (as shown in FIG. 6) includes the pores 104 that extend all the way through the substrate 102.

There are many thin film deposition techniques that can be used to deposit the masking layer for etching the pores 104, and embodiments of the present invention are therefore not limited to those described herein. Such methods include physical vapor deposition (PVD), such as sputtering, e-Beam or thermal evaporation, chemical vapor deposition (CVD), plasma enhanced chemical vapor deposition (PECVD), spin-on glasses, or electro-plating. In addition, there are many etching techniques that can be used to form the pores 104, such as reactive ion etching (RIE), ion beam etching (IBE), and anisotropic or isotropic chemical etching.

Figure 2:
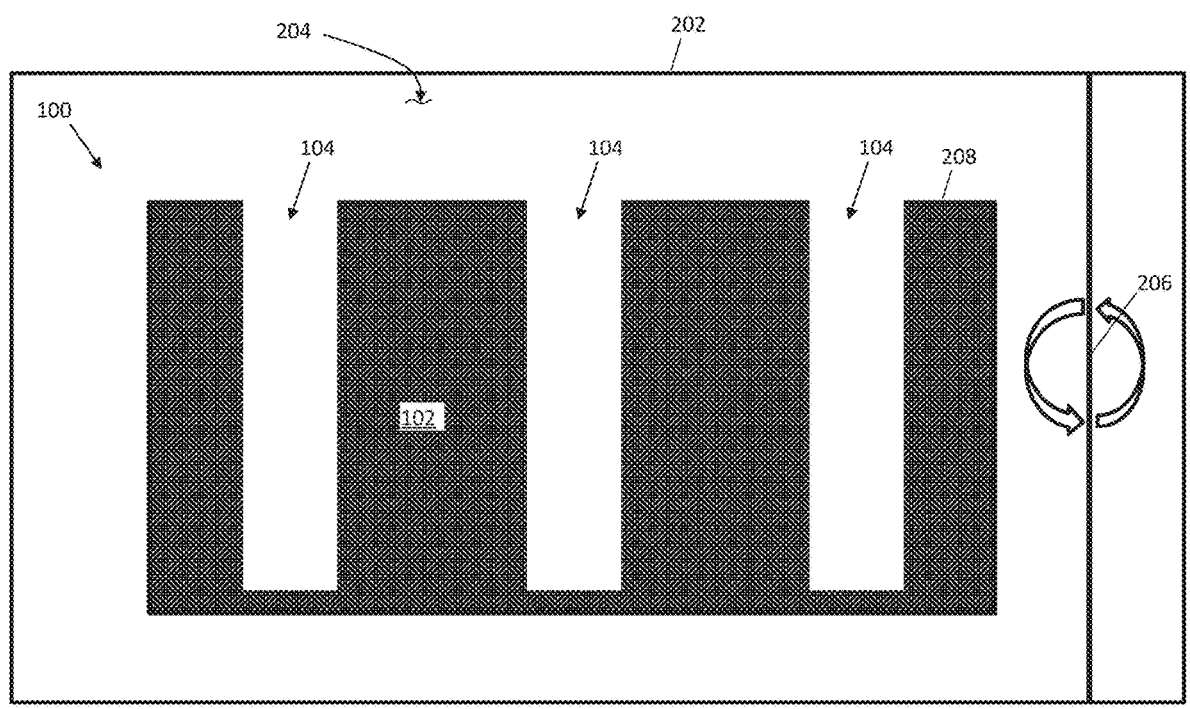
FIG. 2 depicts a cross-sectional side view after spinning the filter shown in FIG. 1B according to embodiments of the present invention.

FIG. 2 depicts a cross-sectional side view after spinning the filter 100 shown in FIG. 1B according to embodiments of the present invention. After forming the filter 100 by microfabrication techniques, the filter 100 is spun about an axis 206 arranged substantially perpendicular to a surface 208 (first surface or top surface) of the filter 100, according to one or more embodiments of the present invention. The filter 100 can be placed inside a chamber including a surface for the filter 100. The filter 100 can be placed inside a coating chamber that allows the filter to spin.

The spin speed and acceleration can be adjusted and will vary depending on the type of filter and the particles to be captured/filtered. The spinning will cause the smaller particles, below a certain size, depending on spin speed/acceleration and particle properties, to move to the outer edges of the substrate or even spin them right off the substrate. By adjusting the spin speed and acceleration the particles can be moved that are much smaller than the desired size towards the edges or off the substrate, while trapping the particles close to the pore sizes with the pores. The particles larger than the pores will not be trapped in the pores. According to one or more embodiments of the present invention, the spin speed is about 10 rpm to about 50,000 rpm in some embodiments of the present invention. The spin speed however will be a strong function of the particle size of interest and the physical and chemical properties of the particles. According to some embodiments of the present invention, the spin acceleration is about 10 to about 5000 rpm/s.

Figure 3:
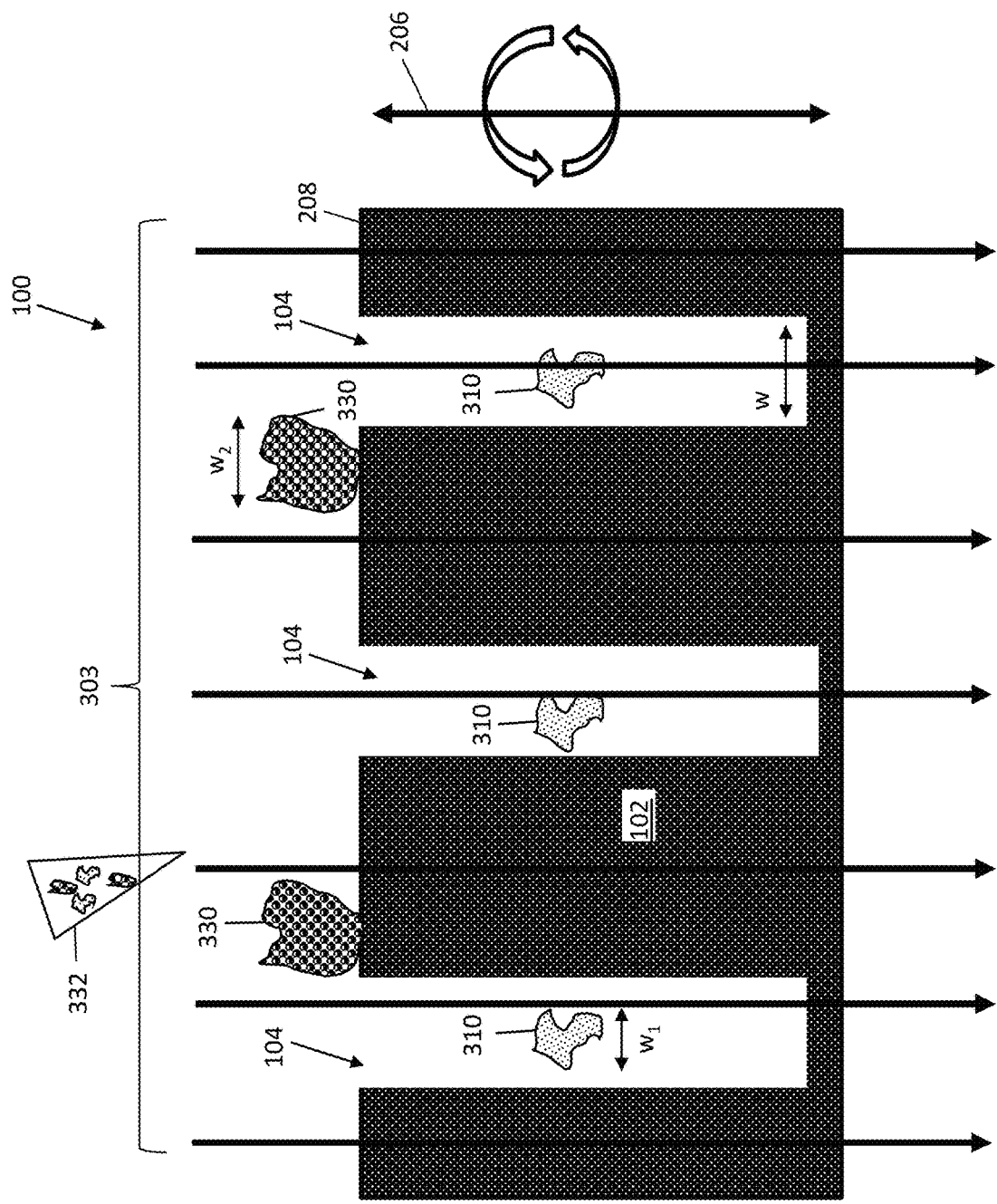
FIG. 3 depicts a cross-sectional side view after applying a magnetic field to the filter shown in FIG. 2 according to embodiments of the present invention.

FIG. 3 depicts a cross-sectional side view after applying a magnetic field 303 and disposing a solution on the spinning filter 100 shown in FIG. 2 according to embodiments of the present invention. While the filter spins 100, an external magnetic field 300 is then applied to the filter 100 by a magnetic field generating device. The magnitude and duration of the applied external magnetic field 300, along with the spin acceleration and speed of the filter 100, are adjusted so that desired particles within a solution 332 are captured/filtered in the filter 100. In the presence of the magnetic field, the magnetic particles have a downward magnetic force exerted on them which forces them downward into the pores, so that they are captured within the pores.

The widths (w) of the pores 104 are also adjusted to optimize the capture of particles of a desired size. Therefore, a combination of the applied magnetic field 303, the acceleration and spin speed of the filter 100, and size of the pores 104 are used to optimize capture of magnetic particles having a desired dimension.

The solution 332 (or suspension) is a liquid solution that includes one or more types of magnetic particles to be captured/filtered. The liquid solution 332 is dispensed onto the spinning filter 100, while the external magnetic field 303 is being applied. First magnetic particles 310 having a width ($w_1$) that is smaller than the width (w) of the pores 104 in the filter 100 can pass through the pores 104 or pores of the filter 100. Second magnetic particles 330 having a width ($w_2$) that is larger than the width (w) of the pores 104 will not pass through the pores 104 and will be separated, remaining on a surface 208 of the filter 100. Thus, the first magnetic particles 310 of interest will be captured within the pores. As described earlier, by adjusting the spin speed, acceleration and strength of the magnetic field, particles within a certain size range are captured by the pores.

Various types of magnetic particles can be filtered/captured using the described methods, which are applicable to a variety of biomedical applications. The magnetic particles (first magnetic particles 310 or second magnetic particles 330) can include either single particles or clusters of particles. According to one or more embodiments of the present invention, the magnetic particles of interest are biochemical metal clusters, such as iron-based clusters, that play roles in the biochemistry of many proteins. According to some embodiments of the present invention, the magnetic particles include iron, nickel, cobalt, or any alloys thereof.

Figure 4:
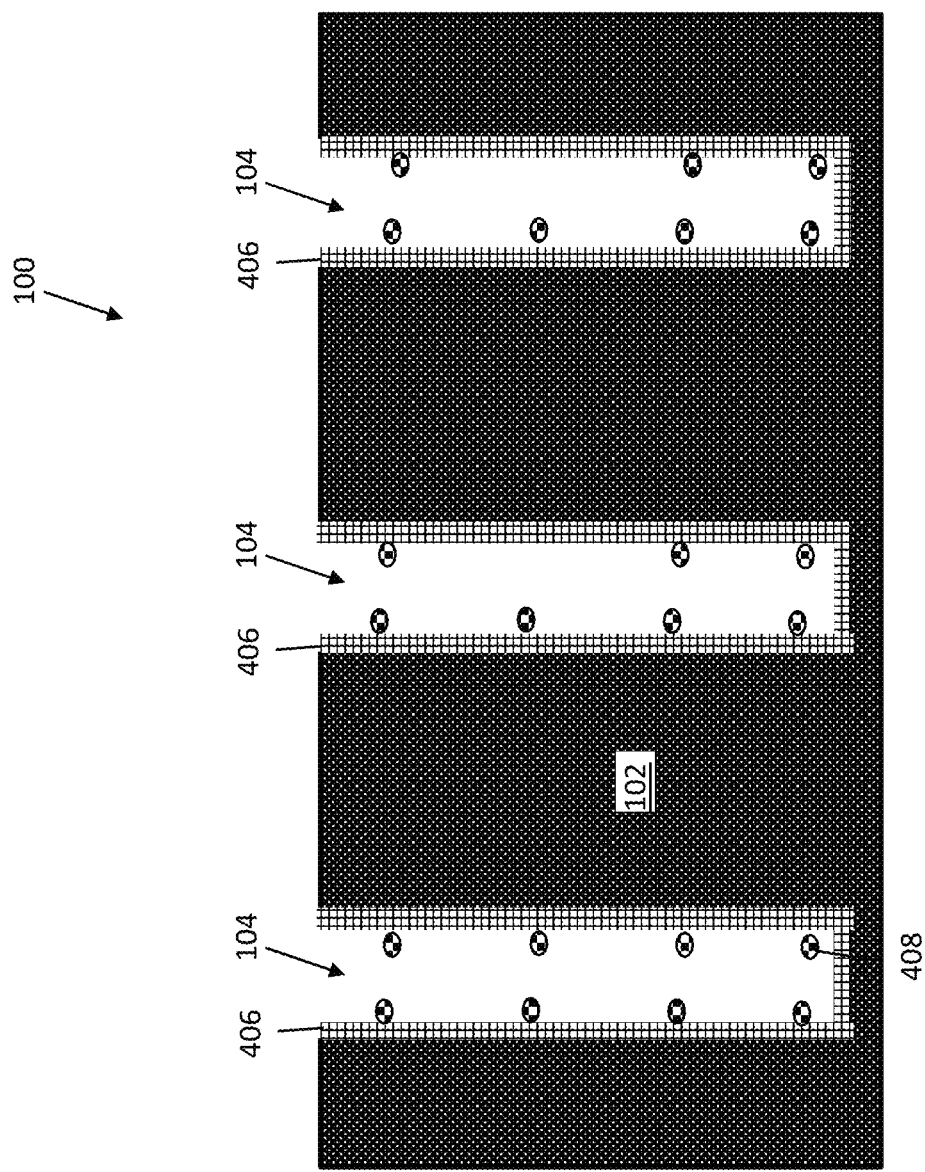
FIG. 4 depicts a cross-sectional side view of a filter with a magnetic liner according to embodiments of the present invention.

In addition to separating magnetic particles as described above by spinning and applying a magnetic field, the filter 100 also can be used to separate nonmagnetic particles from desired magnetic particles. FIG. 4 depicts a cross-sectional side view of the filter 100 according to embodiments of the present invention, which includes a magnetic film 406 liner arranged on sidewalls of the pores 104. The magnetic film 406 lines at least a portion of the pores 104 within the substrate 102. The magnetic film 406 can be deposited by any deposition method, including, but not limited to, physical vapor deposition (PVD), chemical vapor deposition (CVD), plasma enhanced chemical vapor deposition (PECVD), or any combination thereof. The magnetic film 406 can include magnetic particles that are deposited to form a film. The magnetic film 406 includes one or more magnetic materials, including, but not limited to, iron, nickel, cobalt, or alloys thereof.

The magnetic film 406 within the pores 104 can also be coated with a coating. The coating can include ligands 408 or surface functional groups that will bind to a desired magnetic particle, to aid in capture within the pores 104. The ligands 408 include any functional group or compound that will bind to the desired magnetic particles.

Figure 5:
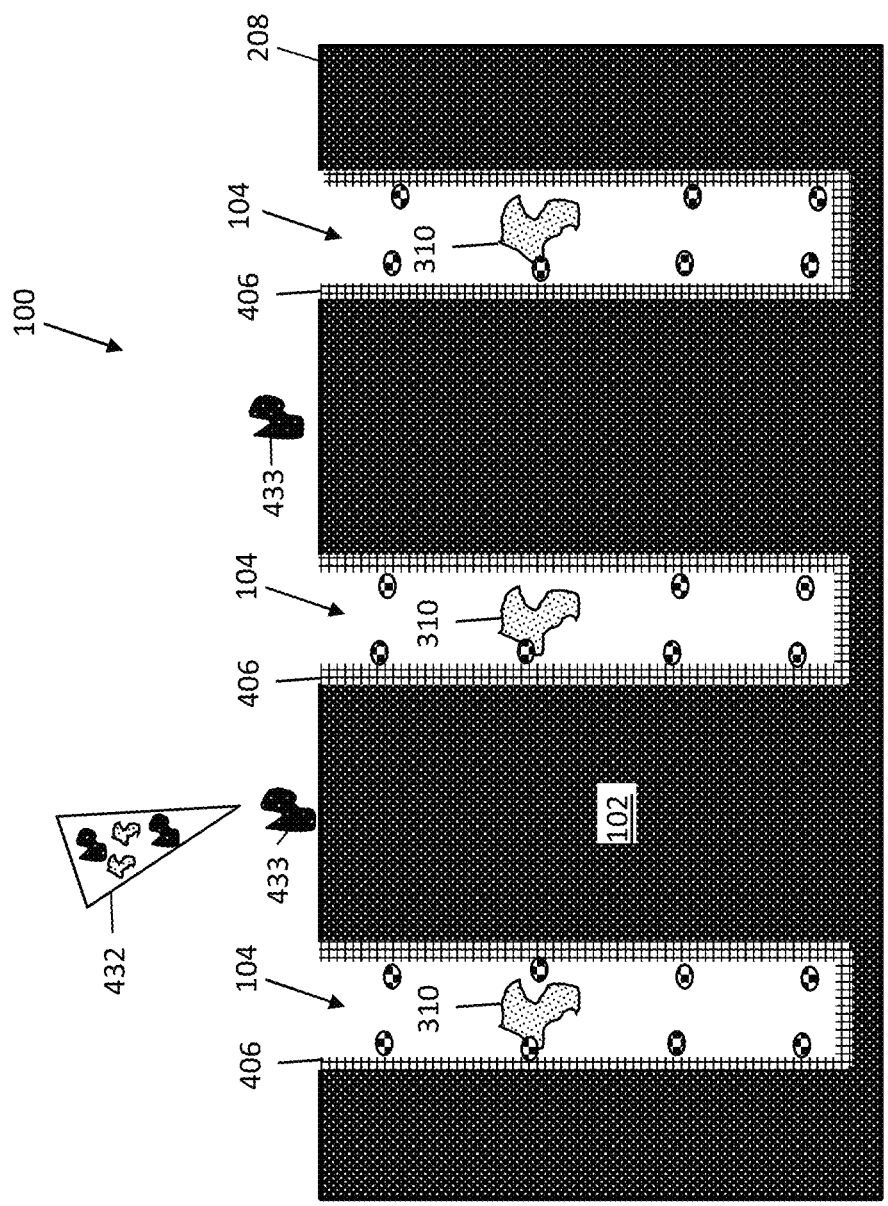
FIG. 5 depicts a cross-sectional side view of captured particles within the filter shown in FIG. 4 according to embodiments of the present invention.

FIG. 5 depicts a cross-sectional side view of magnetic particles 310 captured within pores 104 of the filter 100 shown in FIG. 4 according to embodiments of the present invention. A solution 432 is dispensed onto the filter 100. The solution 432 (or suspension) is a liquid solution that includes one or more types of magnetic particles to be captured/filtered. The magnetic particles 310 will bind to ligands 408 within the pores 104 of the filter 100 and are separated from the non-magnetic particles 433. The non-magnetic particles 433 that are in the correct size range can also fall into the pores 104, but depending on the pore depth and the spin speed, the non-magnetic particles 433 will have a higher probability of being released from the pore 104 than the magnetic particle, which will be held by the ligand. If the non-magnetic particles 433, or magnetic particles, have widths that are greater than the widths of the pores 104, then these larger particles will remain on the surface of the filter 100. An external magnetic field is not needed to capture the particles of interest, since the magnetic field generated by the magnetic film 406 will hold the magnetic particles 310 of interest. Although the coating with ligands 408 aids in capturing the magnetic particles, the coating is not required, as the magnetic particles 310 can directly bind to the magnetic film 406 itself.

The surface of the filters 100 of the present invention can be given various chemical properties depending on the application. For example, surfaces of the filters 100 can be hydrophilic or hydrophobic. A hydrophilic surface is useful for aqueous solutions, and a hydrophobic surface is useful when filtering nonpolar hydrocarbons. The filters can also be made to strongly adsorb certain types of molecules by bonding on the surface monoclonal antibodies. The antibodies would have to be bonded at a part of the antibody that does not interfere with its ability to recognize and adsorb the desired target molecules.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A filter system for filtering magnetic particles, the filter system comprising:
   a micro-machined filter comprising:
   a plurality of pores within a substrate; and
   a magnetic liner arranged on sidewalls and a bottommost surface of pores of the plurality of pores;
   a coating directly on the magnetic liner, the coating comprising a ligand for the magnetic particle of interest, the ligand positioned such that the magnetic liner is between the ligand and the sidewalls or bottommost surface of the pores; and
   wherein a pore of the plurality of pores has a width that is greater than a magnetic particle of interest, such that the magnetic particle of interest binds to the magnetic liner within the pore.

2. The filter system of claim 1, wherein the substrate is a semiconductor material.

3. The filter system of claim 2, wherein the semiconductor material is silicon.

4. The filter system of claim 1, wherein the substrate is a dielectric material.

5. The filter system of claim 4, wherein the dielectric material is glass.

6. The filter system of claim 1, wherein the substrate is a non-magnetic material.

7. The filter system of claim 1, wherein the magnetic particle of interest binds to the ligand.

8. The filter system of claim 1, wherein the magnetic liner comprises iron, nickel, cobalt, or an alloy thereof.

9. The filter system of claim 1, wherein the magnetic particle comprises iron, nickel, cobalt, or an alloy thereof.

10. The filter system of claim 1, wherein pores of the plurality of pores have a plurality of widths.

11. The filter system of claim 1, further comprising a chamber coupled to the micro-machined filter.

12. The filter system of claim 11, wherein the chamber comprises a surface for spinning the micro-machined filter about an axis arranged substantially perpendicular to the surface.

13. The filter system of claim 12, wherein the chamber is capable of adjusting a spin speed of the micro-machined filter from about 10 revolutions per minute (RPM) to about 50,000 RPM at a spin acceleration of about 10 to about 5000 RPM per second.

\* \* \* \* \*